Jan. 12, 1971   L. (WLADYSLAW) PUTKOWSKI   3,553,788
HOT RUNNER SYSTEM FOR PLASTIC INJECTION MOLDS
Filed Sept. 10, 1968   4 Sheets-Sheet 1

*INVENTOR.*
LADISLAO (WLADYSLAW) PUTKOWSKI

BY
*Rogers, Bereskin, & Parr*

HOT RUNNER SYSTEM FOR PLASTIC INJECTION MOLDS

Filed Sept. 10, 1968 4 Sheets-Sheet 2

INVENTOR.
LADISLAO (WLADYSLAW) PUTKOWSKI
BY
Rogers, Bereskin, & Parr

HOT RUNNER SYSTEM FOR PLASTIC INJECTION MOLDS

Filed Sept. 10, 1968

INVENTOR.
LADISLAO (WLADYSLAW) PUTKOWSKI
BY
Rogers, Bereskin, & Parr

Jan. 12, 1971   L. (WLADYSLAW) PUTKOWSKI   3,553,788
HOT RUNNER SYSTEM FOR PLASTIC INJECTION MOLDS
Filed Sept. 10, 1968   4 Sheets-Sheet 4

INVENTOR.
LADISLAO (WLADYSLAW) PUTKOWSKI
BY
Rogers, Bereskin, & Parr

United States Patent Office 3,553,788
Patented Jan. 12, 1971

3,553,788
HOT RUNNER SYSTEM FOR PLASTIC INJECTION MOLDS

Ladislao (Wladyslaw) Putkowski, 21 Limarick Ave., Weston, Ontario, Canada

Filed Sept. 10, 1968, Ser. No. 758,811
Int. Cl. B29f *1/02*
U.S. Cl. 18—30 19 Claims

ABSTRACT OF THE DISCLOSURE

A hot runner system having a hot runner tube extending between a sprue bushing and a nozzle fitting which directs plastic into the mold cavity. The tube is slidable at each end in closely fitting bores in the sprue bushing and nozzle fitting, so that heat expansion of the tube will not push on and tile the nozzle fitting.

In another embodiment, the hot runner tube conducts plastic directly into a gate leading into a mold cavity. The tube has a tip extending into the gate, and the tube can be slid back and forth to control the flow area of the gate.

This invention relates to improvements in injection molds, and more particularly, this invention relates to an improved hot runner system for plastic injection molds.

In the art of injection molding, molten plastic is usually supplied under high pressure by an injection molding machine. This plastic is usually conducted from the injection molding machine to a mold structure, and then through a nozzle in the mold structure and into a mold cavity. When the plastic enters the mold cavity, it freezes to form a desired part. In order to ensure rapid freezing, the mold structure is usually water cooled in the vicinity of the cavity.

The nozzles which direct the plastic into the cavity are of two alternate types, namely, open gate nozzles, and valve type nozzles. A valve type nozzle has an outlet opening or gate which is kept open until the mold is full and then closed to shut off the plastic in the runners and nozzle from that in the cavity. An open gate nozzle has a fairly small outlet opening or gate that cannot be closed, and the plastic in the gate freezes when plastic flow into the mold is terminated upon filling of the mold.

The part of the mold structure which receives the plastic from the injection molding machine is commonly termed a sprue bushing. From the sprue bushing, the plastic is conducted to the nozzles leading into various mold cavities (or to different parts of the same cavity) by conduits called runners. Sometimes these runners are unheated (in which event they are called cold runners), but often they are heated to ensure that the plastic will be kept at a proper temperature during its travel therethrough. When the runners are heated, they are called hot runners, and the mold structure is said to incorporate a hot runner system.

Difficulties have been experienced in the past with hot runner systems for the following reason. In the past, the mold structure has usually included a large block, with channels machined therein for the hot runners, and a mold cavity plate next to the block. Heating of the hot runners was accomplished by heater elements buried in the block, while the necessary cooling of the mold cavity plate was accomplished by water cooling channels in the plate. The temperature differential between the block and the plate caused heat expansion of the hot runner block with little corresponding expansion in the cooled mold cavity plate. This differential expansion of the block and plate tended to cause tilting of the nozzles (usually) firmly located in the hot runner block to avoid leakage) directing plastic into the mold cavity. Since the opening through which a nozzle discharges into the mold cavity is very small and must be precisely aligned, tilting of the nozzles often leads to improper operation.

Accordingly, it is an object of this invention to provide a hot runner that is largely separated from the mold cavity plate, so that heat transfer from the hot runner to the mold plate will be reduced. In a preferred embodiment of the invention, the hot runner is slidable in two fittings firmly fixed with respect to the cavity plate, in order to eliminate the effects of expansion of the hot runner.

Further objects and advantages of the invention will appear from the following disclosure, taken together with the accompanying drawings, in which.

Figure 1:
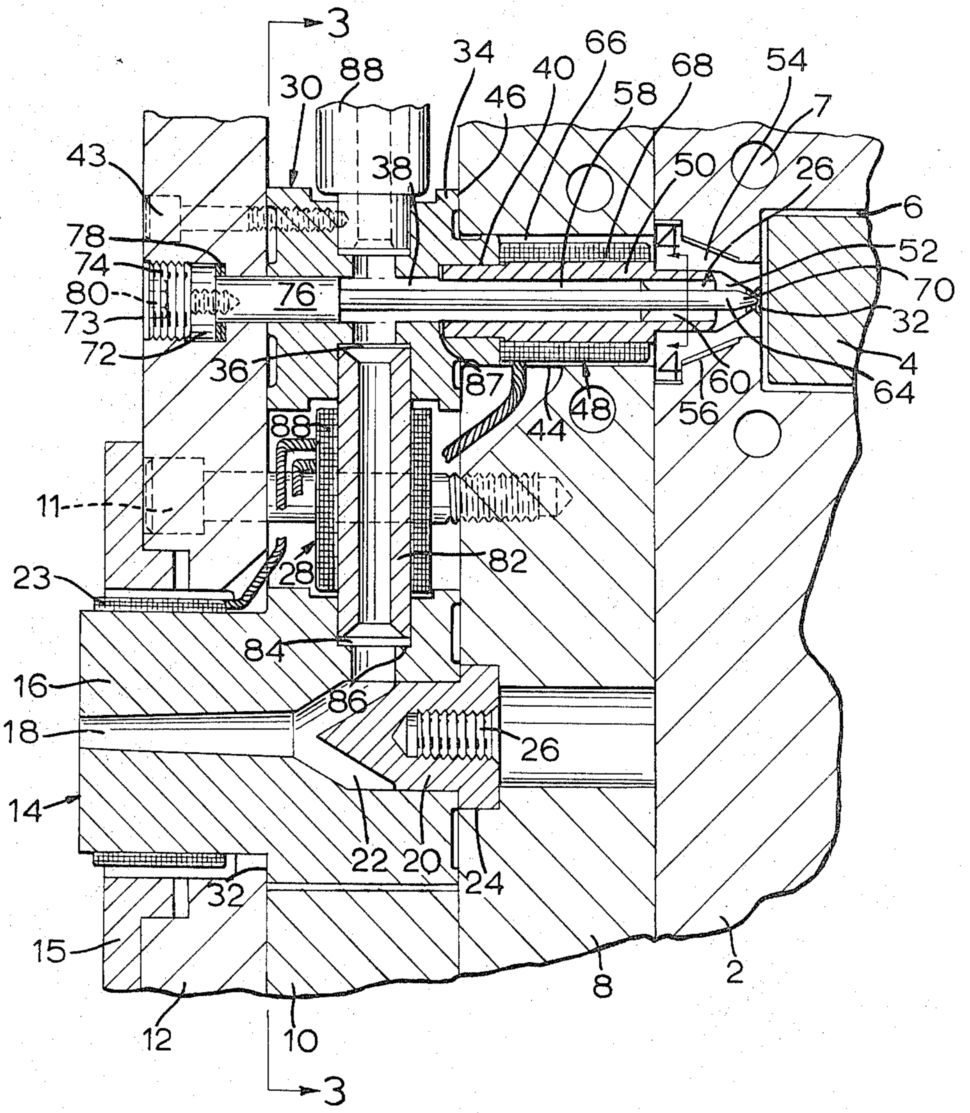
FIG. 1 is an elevation, in section, showing a sprue bushing, hot runner, and nozzle in position on a cavity plate.
Figure 3:
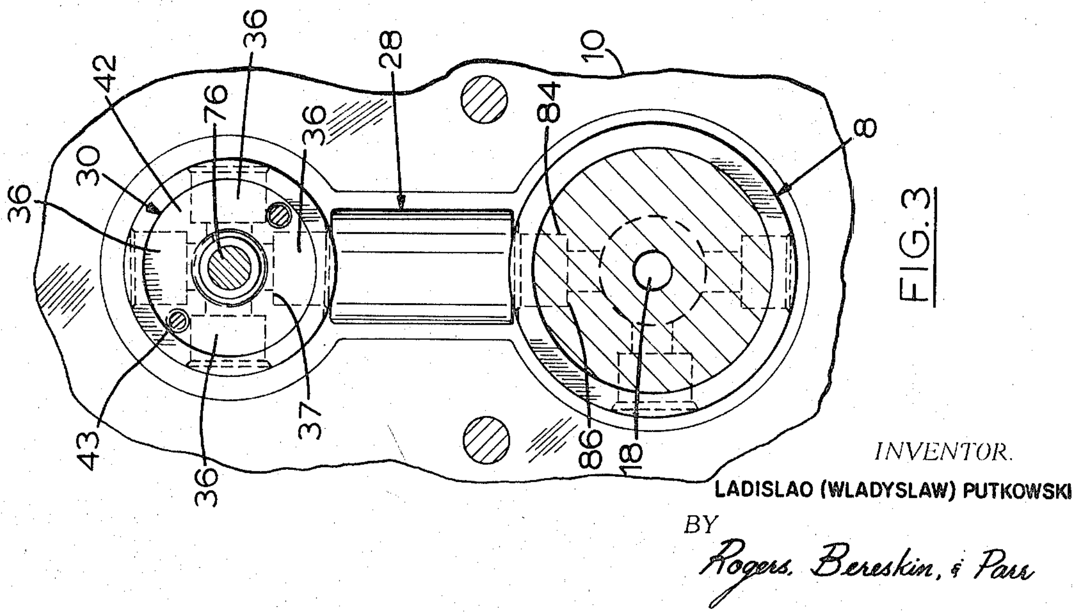
FIG. 3 is a sectional view along lines 3—3 of FIG. 1.

Reference is first made to FIG. 1, which shows a mold cavity plate 2 forming with another plate 4 a cavity 6 into which molten plastic is to be injected to form a desired part. Cooling channels 7 in the cavity plate permit flow of cooling water. Connected to the cavity plate 2 are three further plates, namely a rear plate 8, an intermediate spacer plate 10 (best shown in FIG. 3), and a front plate 12. The rear plate 8 is fixed to cavity plate 2 by screws (not shown), and the intermediate and front plates 10, 12 are fixed to the rear plate by screws 11.

The molten plastic enters the apparatus from an injection molding machine (not shown) through a sprue bushing generally indicated at 14. A locating ring 15 around the sprue bushing locates the mold structure in the machine. The sprue bushing 14 includes an outer casing 16 located in an aperture in the front plate 12. Casing 16 has a dome shaped hollow interior and a central axial channel 18 through which plastic from the injection molding machine (not shown) enters the mold structure. The sprue bushing 14 further includes an inner flow deflector 20 which, together with the outer casing 16, defines a narrow annular slot 22. The slot 22 is provided to direct plastic entering through the channel 18 to improve its flow qualities. A heater element 23 encircles the outer casing 16 to maintain the plastic at a desired temperature.

The flow deflector 20 fits tightly in the hollow in outer casing 16 and has a head 24 located in rear plate A. An interior thread 26 is provided to permit connection of a tool to pull the flow deflector 20 out of casing 16 should the need arise.

From the sprue bushing the molten plastic travels through a hot runner generally indicated at 28. The plastic then travels through a nozzle assembly generally indicated at 30, and is injected through a gate (i.e. an outlet aperture) 32 at the tip of the nozzle assembly into the mold cavity 6.

Figure 2:
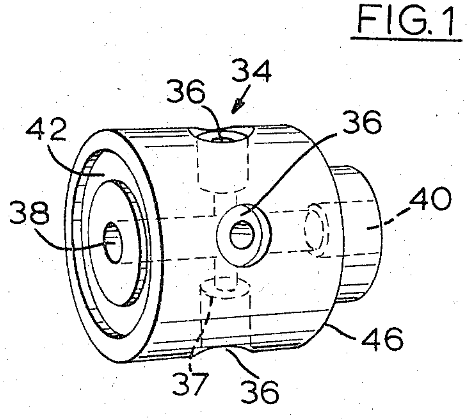
FIG. 2 is a perspective view showing a nozzle fitting of FIG. 1.

The nozzle assembly 30 includes a nozzle fitting 34 also shown in perspective in FIG. 2. Fitting 34 contains one or more bores 36 for insertion of hot runners; in the embodiment shown, it contains four such bores (FIG. 3) for connection of four runners. Each bore 36 has an end wall 37 having an aperture communicating with a central axial passage 38 extending through fitting 34. Passage 38 includes an enlarged bore 40 at its rear surface. The front surface of fitting 34 is generally flat, except for a groove 42 to provide air insulation, and rests against the rear surface of front plate 12 where it is held by screws 43. The rear surface of fitting 34 is of reduced diameter to fit snugly within a hole 44 in rear plate 8, with a shoulder 46 of fitting 34 pressing against the front surface of rear plate 8.

The nozzle assembly 30 further includes a hot runner generally indicated at 48. The runner 48 includes a tube 50 one end of which fits slidably in the enlarged opening 40 in the nozzle fitting, and the other end of which fits slidably in an opening 52 in a gate insert member 54. The gate insert membr 54 fits snugly in an opening in the cavity plate 2 and has at its rear surface the gate or outlet opening 32. An insulation gap 56 reduces heat leakage from the gate insert to the mold.

Figure 4:
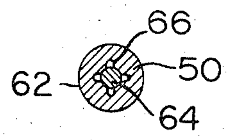
FIG. 4 is a sectional view along lines 4—4 of FIG. 1.
Figure 6:
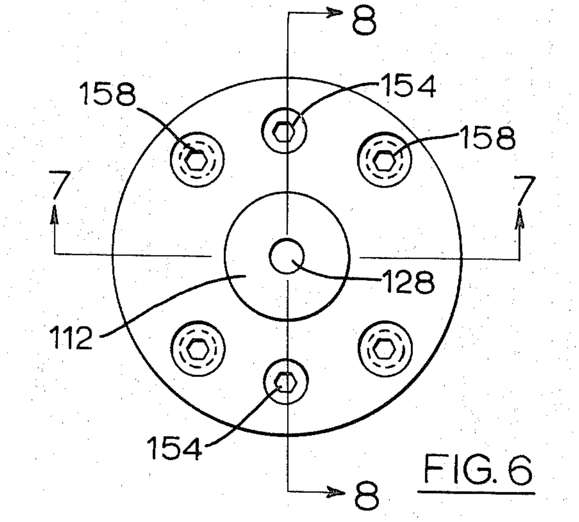
FIG. 6 is a top view showing a valve type nozzle (without its top cover plate) according to the invention.

The tube 50 includes an interior axial opening 58 cylindrical in cross-section except for a portion 60 adjacent and within the gate insert member 54. Portion 60 has a narrowed opening 62 (FIG. 4) to guide a stem 64 (FIG. 1) and several lobes 66 to conduct molten plastic. An electric heater 68 encircles tube member 50 betwen the nozzle fitting 34 and the gate insert 54 to heat plastic flowing through tube 50.

The stem 64 is provided to adjust the outlet area of gate 32. Stem 64 includes a needle tip 70 which projects part way into the gate 32, and a head 72 held in a well 73 in the front plate 12 by a set screw 74. The part of the stem between the set screw 74 and the bores 36 is enlarged as indicated at 76 and fits snugly in opening 38 in the nozzle fitting 34 to prevent leakage of plastic.

The position of the stem is controlled by shims 78 located below the head 72. To vary the penetration of tip 70 into gate 32, the set screw 74 is removed, stem 64 is pulled out by inserting a tool having a threaded end into a threaded opening 80 provided in head 74 for this purpose, and shims 78 are then added or removed as required. If a valved nozzle instead of a gate type nozzle is required. Then instead of the shim arrangement. an actuator (typically a piston and cylinder) can be provided to move the stem.

The runner 28 includes a tube 82 one end of which fits slidably in one of the bores 36 in the nozzle fitting 34, and the other end of which fits slidably in an aligned bore 84 in the outer casing of the sprue bushing 14. Bore 84 has an end wall 86 containing an aperture communicating with space 22 in the sprue bushing. A heater coil 88 encircles that portion of tube 82 located between the bores and ensures that plastic flowing through the tube 82 will be kept sufficiently hot.

Tube 82 is preferably made of a material having a greater thermal coefficient of expansion than the material of the sprue bushing outer casing 16 and of the nozzle fitting 34. Similarly tube 50 typically has a greater thermal coefficient of expansion than the material of the nozzle fitting and the gate insert. This ensures a fairly tight (but slidable) fit between the tubes and the sprue bushing, the nozzle fitting, and the gate insert, to prevent leakage. (For example, tubes 50, 82 can be made of stainless steel, and the sprue bushing casing 16, nozzle fitting 34, and gate insert 54 can be made of tool steel. The differential coefficient of expansion is not absolutely necessary but it permits easy assembly of the parts when they are cool, with a snug (but slidable) fit when they are hot.

It will be noted that the ends of tube 82 are spaced slightly from the end walls of the bores 84, 36 in which tube 82 is located. This allows tube 82 room to expand lengthwise without tilting the nozzle assembly. The amount of room needed to allow for lengthwise expansion of tube 82 is fairly small; for example, a four inch long tube 82 will expand approximately only 20 thousandths of an inch during heating to operating temperatures. However, if this expansion room were not provided, then differential expansion between tube 82 and cavity plate 2, even though slight, would cause misalignment of the nozzle and difficulty in molding. The spacing between the ends of the tube 82 and end walls of the aligned bores 36, 84 is sufficient to allow for the maximum expected expansion of tube 82.

Provision of such sliding room for expansion is not absolutely necessary for tube 50 of hot runner 48, because the tendancy of tube 50 to expand is largely counteracted by the pressure of the plastic injection molding machine (not shown) pressing against the mold structure. In addition, slight expansion of tube 50 will not normally cause difficulty. However, room for expansion of tube 50 may be left if desired by spacing the left end of tube 50 from the end wall of bore 40, as shown at 87.

The apparatus shown may be assembled as follows. Assume that the initial situation is that rear plate 8 is screwed to cavity plate 2 with gate insert 54 in position, and that intermediate spacer plate 10 is in position. Then, firstly, sprue bushing 14, with deflector 20 in place, is located in front plate 12. Next, one end of tube 82 of runner 28 is located in bore 84 of sprue bushing 14. Next, nozzle fitting 34 is slid over the rear surface of front plate 12 and one of its bores 36 is inserted over the other end of tube 82. Then, adjusting stem 64 is pushed through hole 73 in front plate 12 and through the nozzle fitting to locate the nozzle fitting in position. Screws 43 are then inserted and screwed in without tightening.

Typically there will be further nozzle assemblies, connected to nozzle assembly 30 by further hot runners such as runner 28 (FIG. 1). When all of the nozzle fittings of such nozzle assemblies have been located in position on the front plate, the hot runner 48 of nozzle assembly 30 (and other similar runners for other nozzle assemblies) are slid into position. The connecting wires from the electric heaters are then connected to a connecting block (not shown), and the front plate with the sprue bushing, runners, and nozzle assemblies in place is moved into position on rear plate 2. Screws 11, 43 are then tightened.

The system described is readily adaptable to various types of molds, since hot runner 28 may be made in various lengths depending on the spacing of the sprue bushing 14 from the nozzle assembly 30. In addition, further hot runners may be connected as required either to the sprue bushing or to nozzle fitting 34, depending on the number of bores provided in each.

Because hot runner 28 is largely separated from rear plate 8 and also from front plate 12, transfer of heat from runner 28 to these plates is reduced. During heating of the mold, the nozzles are moved laterally from the sprue bushing 14 by the amount of heat expansion in the relatively cold plates 8, 12, but they are held concentric with the gate 32 because of the slidability of hot runner 28 in bores 36, 84.

Figure 5:
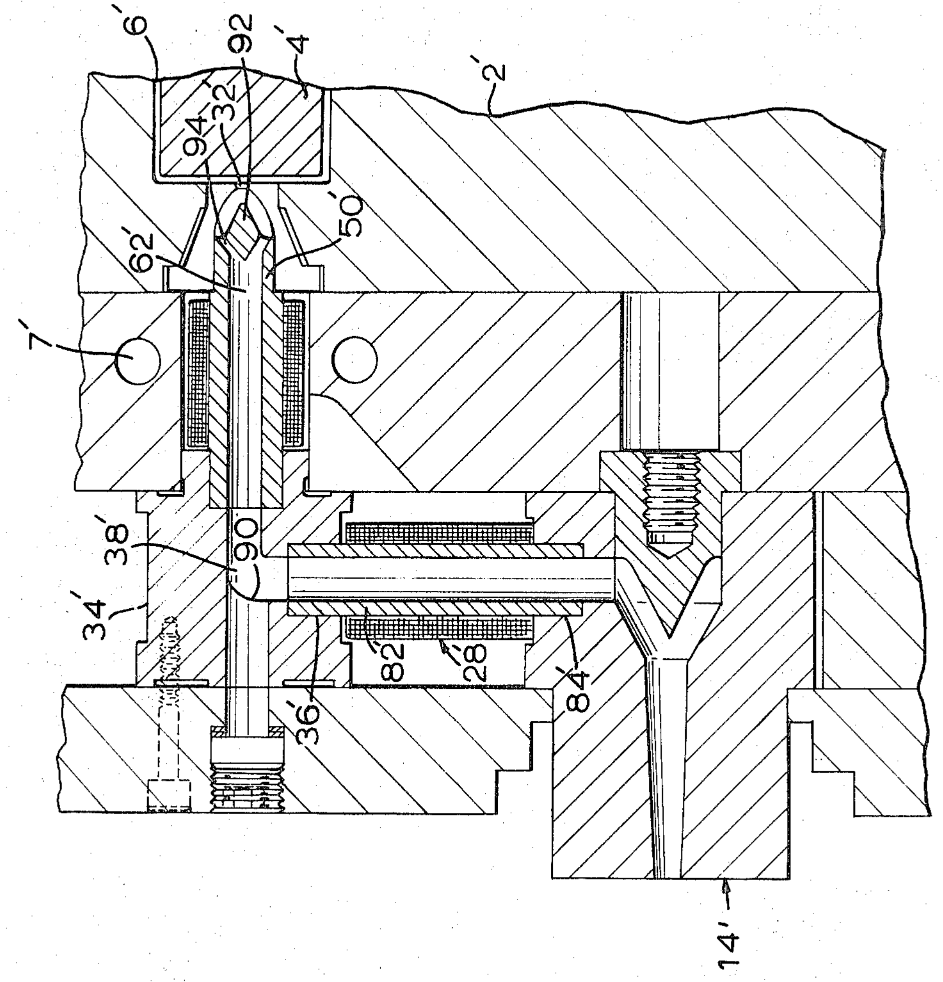
FIG. 5 is an elevation, in section, showing a modification of the hot runner and nozzle of FIG. 1.

Reference is next made to FIG. 5, which shows a modification of the embodiment of FIGS. 1 to 4. In the FIG. 5 embodiment, primed reference numerals indicate parts corresponding to those of FIGS. 1 to 4.

The FIG. 5 embodiment is designed for plastics of a type which burn easily so that no sticking or stagnating of the plastic in the conduits can be tolerated. Accordingly, tube 82′ of hot runner 28′ is of calibrated length, so that when it is cold, the usual gap shown in FIG. 1 exists between its ends and the end walls of bores 84′, 36′, but when it reaches operating temperature, tube 82′ expands sufficiently that its ends reach the end walls of the bores and seal any gap between them, as shown in FIG. 5. Alternatively, seals of resilient material could be used at the ends of the tubular member to seal any gaps or pockets at operating temperature. Typical such materials (depending on the type of plastic being molded and the temperature) are silver, copper, high temperature plastics, and silicone rubber.

In the nozzle assembly 30′ the long adjustable stem 64 has been removed and replaced by a stem 64′ having a curved end surface 90 which directs plastic through channels 38′, 62′ in the nozzle fitting 34′ and in tube 50′. The channel 62′ in tube 50′ is simply circular in cross-section. At its end, tube 50′ has a torpedo-like obstruction 92 so that the plastic is forced to flow through encircling apertures 94, to assist its uniformity of flow.

Reference is next made to FIGS. 6 to 9 which show a valve type nozzle 100 for use when it is necessary to conduct the plastic in as straight a path as possible with few variations in diameter of the conduits carrying the plastic. In the FIGS. 6 to 9 embodiment the cavity plate and mold cavity are respectively illustrated at 102, 104, and the main outer casing of the nozzle assembly is formed in three parts, namely, a lower or gate insert member 106 having an outlet opening or gate 108 into the mold cavity 104, an intermediate guide tube 110, and a front part 112 which may conveniently be termed a nozzle fitting (or a hot runner receiving member). The three parts of the outer casing are press fitted together but can be pried apart if necessary by insertion of tools in slots such as slot 114, and together the three parts define an opening in which a hot runner 116 is located.

The hot runner 116 includes a tube 118 slidably journalled at one end in a bore 120 in nozzle fitting 112, and at its other end in a bore 122 in the gate insert member 106. Grooves 124 are provided to catch leaking plastic and help provide a seal between the members. A heater 126 encircles tube 118 to heat plastic flowing therethrough.

Plastic enters the nozzle fitting 112 via an aperture 128, travels through bore 120 and through tube 118, and at the bottom of the tube the plastic encounters a torpedo-like obstruction 130. This forces the plastic into small apertures 132 to improve its flow characteristics.

Figures 7, 8, 9:
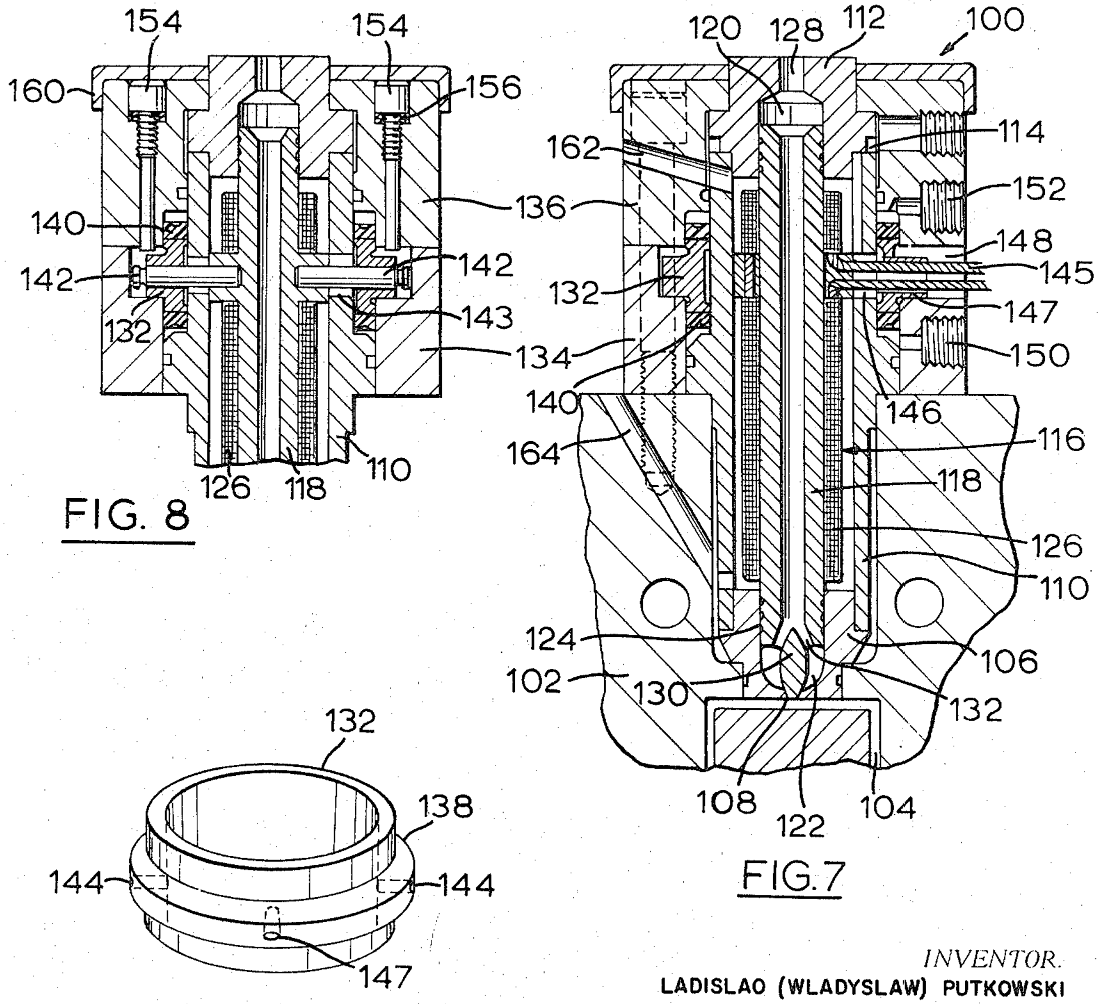
FIG. 7 is a sectional view along lines 7—7 of FIG. 6 with the cover plate in place.
FIG. 8 is a sectional view along lines 8—8 of FIG. 6 with the cover plate in place.
FIG. 9 is a perspective view of a piston for the nozzle of FIGS 6 to 8.

The hot runner 116 is made to move up and down by a piston 132 (shown in perspective in FIG. 9). The piston 132 fits in a cylinder defined by the outer surface of guide tube 110 and by a split outer housing consisting of rings 134, 136 meeting end to end and encircling the guide tube 110 and nozzle fitting 112. The piston 132 is generally cylindrical member in shape (FIG. 9) but has a middle peripheral outwardly projecting flange 138. Sealing rings 140 sit loosely on the top and bottom of the piston and are held thereagainst by fluid pressure when needed.

The piston 132 is connected to the hot runner 116 by pins 142 (FIG. 8). The pins 142 extend through apertures 143 (FIG. 8) in the guide tube 110, and through apertures 144 (FIG. 9) in the peripheral flange 138 of the piston. The heater connecting wires 145 extend through an aperture 146 in the guide tube, through an aperture 147 in the piston flange and then through an aperture 148 in the outer housing section 134. In order to actuate the piston, fluid openings 150, 152 are formed in the housing sections 134, 136 on each side of the piston. Screw-in limit pins 154 (FIGS. 6, 8) control the maximum upward movement of the piston and can be adjusted by removing or inserting shims 156. The structure is held together to the mold plate by four screws 158.

The nozzle just described is assembled as follows. Firstly, the gate inserts 106 (which is not yet inserted in the cavity plate 102) is located on guide tube 110. Next the bottom sealing ring 140 and the piston 132 are located over the guide tube. Next, the hot runner 116 is brought near the guide tube 110 and the connecting wires 145 from the hot runner (these wires are quite long) are pushed through the hole 146 in the guide tube and through the hole 147 in the piston. The wires 145 are then drawn tight and the hot runner 116 slipped into the gate insert 106 with the piston in position encircling the guide tube 110. Next, the nozzle fitting 112 is pressed onto the top of the guide tube 110 and the pins 142 are pushed into position to hold the piston to the hot runner. (The holes on the hot runner and in the piston for the pins 142 are roughly aligned at this time by the heater wires 145.)

The lower ring 134 of the outer casing can be placed in position at any time before the nozzle structure is placed in the cavity plate. The top ring 136 of the outer casing is placed in position at this time, and the nozzle structure 100 is screwed to the cavity plate. A cover plate 160 is then snapped on to prevent leaking plastic from reaching the heads of screws 158. Passages 162, 164 are provided in upper outer casing ring 136, and in the mold plate, to conduct away leaking plastic.

A feature of the valve type nozzle shown in FIGS. 6 to 9 is that it may be constructed so that either (a) the pressure of the plastic has no tendency to open or close the nozzle, or alternatively (b) the pressure of the plastic tends to shut off the nozzle, or alternatively (c) the pressure of the plastic tends to open thenozzle. This may be accomplished by varying the relative internal diameters of the gate insert 106 and the nozzle fitting 112, with corresponding changes in the diameters of the ends of hot runner tube 118. For example, if the internal diameter of nozzle fiting 112 is made greater than that of gate insert 106, the pressure of the plastic will tend to close the nozzle (unless the nozzle is held open by the piston 132). If the diameters are equal (as shown), the valve is balanced and the plastic pressure will tend neither to open nor to close the nozzle, while if the internal diameter of gate insert 106 exceeds that of nozzle fitting 112, the pressure of the plastic will tend to hold the nozzle open.

Figure 10:
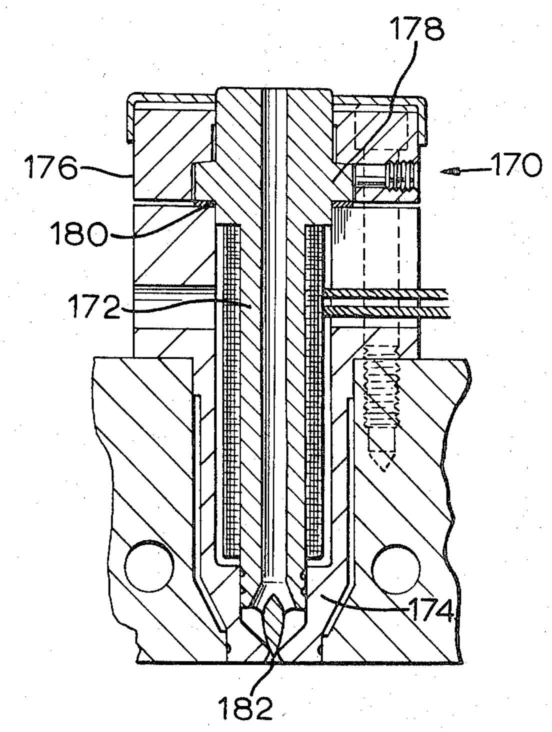
FIG. 10 is an elevation, in section, of an adjustable gate type nozzle according to the invention.

Reference is next made to FIG. 10, which shows a device similar to that shown in FIGS. 6 to 9 except that the FIG. 10 device is an adjustable gate type nozzle instead of a valve type nozzle. In the FIG. 10 nozzle, generally denoted at 170, an inner hot runner 172 is slidably mounted in an outer casing having a gate insert member 174, and a hot runner receiving member 176. Members 174, 176 are spaced apart by an adjusting shim 180 located between a flange 178 of hot runner 172 and gate insert 174. The penetration of the tip of the hot runner 172 into the gate 182 of gate insert 174 can be varied by varying the thickness of adjusting shim 180.

If desired, the FIG. 1 embodiment may be modified by spacing the front plate 12 farther from the rear plate 8 and inserting a piston and cylinder adjacent the front of the stem 76 to move the stem 76 back and forth, substantially as described and illustrated in my copending application entitled "Internally Heated Adjustable Gate and Value Type Nozzle for Plastic Injection Molds," Ser. No. 758,818, Pat. No. 3,518,515, filed concurrently herewith. In this arrangement the stem will be coaxial with the piston and in effect will form an elongated piston rod projecting from the cylinder through nozzle fitting 30 and through hot runner tube 50 into the gate insert 54. This will convert the nozzle shown in FIG. 1 from a gate type nozzle to a valve type nozzle.

What I claim as my invention is:

1. For a plastic injection mold structure, a hot runner system comprising: a first member adapted to be located in said mold structure, said first member having a first bore therein; a second member adapted to be located in said mold structure at a position spaced from said first member, said second member having a second bore therein adapted to be axially aligned with said first bore when said first and second members are located in said mold structure, a tubular member for conducting molten plastic between said first and second members, said tubular member having a first end snugly but slidably fitted into said first bore and a second end snugly but slidably fitted into said second bore, at least one end of said tubular member being separated from the end of the bore in which it is fitted at least when said tubular member is cold, whereby said tubular member may expand axially without pushing said first and second members apart, and a heater extending along said tubular member between said bores to heat said plastic flowing through said tubular member.

2. Apparatus according claim 1 wherein said first member is a sprue bushing and said second member is a nozzle fitting and wherein said tubular member has a thermal coefficient of expansion greater than the thermal coefficient of expansion of said sprue bushing and of said nozzle fitting.

3. Apparatus according to claim 1 wherein said first member is a nozzle fitting adapted to receive plastic, and said second member is a gate insert adapted to be inserted in a cavity plate of said mold structure, said gate insert having a gate therein for directing plastic into a mold cavity of said mold structure.

4. Apparatus according to claim 3 including a stem extending through said nozzle fitting and through said tubular member and having a tip penetrating into said gate, and means associated with said stem to adjust the penetration of said tip into said gate thus to adjust the effective opening of said gate.

5. Apparatus according to claim 3 including piston and cylinder actuating means coupled to said tubular member for moving said tubular member axially in said bores, said tubular member including at one end thereof a tip projecting into said gate to control the effective opening of said gate.

6. In a plastic injection mold structure including a cavity plate, and a sprue bushing fixed relative to said cavity plate, a hot runner system comprising: a nozzle assembly spaced along said cavity plate from said sprue bushing for receiving plastic from said sprue bushing and directing said plastic into a mold cavity in said structure, said nozzle assembly including a nozzle fitting having a central aperture and at least one first radial bore communicating with said central aperture, said bore being spaced from said cavity plate; said sprue bushing having a passage therein to receive plastic and having a second radial bore communicating with said passage, said second radial bore being spaced from said cavity plate and being axially aligned with said first bore; a tubular member for conducting molten plastic between said sprue bushing and said nozzle fitting, said tubular member having a first end snugly but slidably fitted into said first bore and a second end snugly but slidably fitted into said second bore, at least one end of said tubular member being separated from the end of the bore in which it is fitted at least when said tubular member is cold, whereby said tubular member may expand axially without pushing said sprue bushing and nozzle fitting apart, and a heater extending along said tubular member between said bores to heat plastic flowing through said tubular member, said tubular member and heater being spaced by an air gap from said cavity plate to reduce heat transfer from said tubular member and heater to said cavity plate.

7. Apparatus according to claim 6 including a rear plate overlying said cavity plate and a front plate spaced from said rear plate, said sprue bushing and nozzle assembly each extending through said front plate to said rear plate, said tubular member and heater being spaced by an air gap from both said front and rear plates.

8. Apparatus according to claim 7 wherein said nozzle fitting includes a plurality of said first radial bores to acommodate a plurality of said tubular members.

9. Apparatus according to claim 7 wherein said nozzle assembly includes a gate insert in said cavity plate, said gate insert having a gate therein to direct plastic into said mold cavity and a bore located forwardly of said gate to receive a hot runner; said nozzle fitting includes a rear surface facing and spaced from said gate insert and having a further bore therein communicating with said central aperture; and a hot runner having a second tubular member extending between and fitted snugly but slidably in the bores in the rear surface of said nozzle fitting and in said gate insert, said hot runner including a heater extending along said second tubular member to heat plastic flowing through said second tubular member.

10. Apparatus according to claim 9 including a stem extending through said front plate and through said central aperture in said nozzle fitting and through said second tubular member into said gate to control the effective opening of said gate.

11. For plastic injection molding, a nozzle incorporating a hot runner therein, said nozzle comprising:

(a) an outer casing including a gate insert at one end thereof, a hot runner receiving member at the other end thereof, and means connecting said gate insert and hot runner receiving member, (b) a hot runner having first and second ends and having a channel extending axially therein from an inlet at said first end to an outlet near said second end, (c) said second end of said hot runner being journalled with a snug but sliding in said gate insert and said first end of said hot runner being journalled with a snug but slidable fit in said hot runner receiving member, (d) the second end of said hot runner including a tip to cooperate with said gate to vary the flow conducting area of said gate when said tip is moved into said gate, (e) and a heater extending along said hot runner intermediate said first and second ends to heat plastic flowing through said hot runner.

12. Apparatus according to claim 11 wherein said nozzle is a gate type nozzle, said hot runner including a flange projecting therefrom and on which said hot runner receiving member passes, said apparatus further including at least one shim located between said flange and said gate insert to space the same apart to control the penetration of the tip of said hot runner into said gate, said means connecting said gate insert and said hot runner receiving member including screws connecting said gate insert and said hot runner receiving member.

13. Apparatus according to claim 11 wherein said nozzle is a valve type nozzle and includes actuating means connected to said hot runner for moving said hot runner axially to open and close said gate.

14. Apparatus according to claim 13 wherein said actuating means comprises a piston encircling said hot runner exteriorly of said outer casing, means extending through said outer casing connecting said piston to said hot runner, and a housing encircling said outer casing and defining therewith a cylinder for said piston.

15. Apparatus according to claim 7 wherein said sprue bushing includes a plurality of said second radial bores to accommodate a plurality of said tubular members.

16. Apparatus according to claim 4 wherein said means associated with said stem to adjust the penetration of said tip into said gate comprises piston and cylinder means.

17. For a plastic injection mold structure, a hot runner system comprising: a first member adapted to be located in said mold structure, said first member having a first bore therein; a second member adapted to be located in said mold structure at a position spaced from said first member, a tubular member for conducting molten plastic between said first and second members, said tubular member having a first end adapted to be snugly but slidably fitted into said first bore and a second end adapted to be connected to said second member, said first end of said tubular member being slidable relative to the inner end of said first bore, and a heater coupled to said tubular member between said bores to heat said plastic flowing through said tubular member.

18. Apparatus according to claim 17 wherein said tubular member is separated by an air gap from said mold structure over a substantial portion of its length, to reduce heat transfer from said tubular member to said mold structure.

19. Apparatus according to claim 18 wherein said second end of said tubular member is slidable relative to said mold structure.

References Cited

UNITED STATES PATENTS 2,878,515 3/1959 Strauss ---------------- 18—30

FOREIGN PATENTS 676,536 7/1952 Great Britain.

H. A. KILBY, Jr., Primary Examiner